(12) United States Patent
Wetzel et al.

(10) Patent No.: US 6,584,396 B2
(45) Date of Patent: Jun. 24, 2003

(54) METHOD FOR DETERMINING THE LATERAL ACCELERATION OF A MOTOR VEHICLE

(75) Inventors: Gabriel Wetzel, Stuttgart (DE); Ian Faye, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/979,352

(22) PCT Filed: Jan. 31, 2001

(86) PCT No.: PCT/DE01/00364

§ 371 (c)(1),
(2), (4) Date: Jun. 21, 2002

(87) PCT Pub. No.: WO01/70549

PCT Pub. Date: Sep. 27, 2001

(65) Prior Publication Data

US 2002/0183914 A1 Dec. 5, 2002

(30) Foreign Application Priority Data

Mar. 22, 2000 (DE) .......................................... 100 14 220

(51) Int. Cl.$^7$ .................................................. G06G 7/76
(52) U.S. Cl. ....................... 701/70; 701/69; 280/5.508; 180/199
(58) Field of Search ............................. 701/69, 70, 72, 701/79, 80; 280/5.504, 5.508; 180/197, 199; 477/900, 904

(56) References Cited

U.S. PATENT DOCUMENTS

| 4,761,022 A | * | 8/1988 | Ohashi et al. ............ 280/5.504 |
| 4,937,748 A | * | 6/1990 | Yonekawa et al. ............. 701/38 |
| 5,270,930 A | * | 12/1993 | Ito et al. ........................ 701/69 |

FOREIGN PATENT DOCUMENTS

| DE | 39 32 569 | 4/1991 |
| DE | 40 03 746 | 8/1991 |
| DE | 43 14 830 | 11/1994 |
| EP | 0 529 280 | 3/1993 |
| EP | 0 943 514 | 9/1999 |

\* cited by examiner

Primary Examiner—Gertrude Arthur
(74) Attorney, Agent, or Firm—Kenyon & Kenyon

(57) ABSTRACT

In a method for determining the lateral acceleration of a motor vehicle, the lateral acceleration is calculated from signals of a wheel sensor and a load sensor. Since in many cases these sensors are already present on the vehicle, e.g., for chassis control, additional sensors are not necessary. The values for the lateral acceleration thus ascertained may then be used in further devices, such as for a vehicle dynamics controller or a device for preventing tipping. For example, usable as a load sensor in the case of a pneumatic suspension is also a pressure sensor which measures the pressure within the pressure bellows of the pneumatic suspension and supplies a signal, corresponding to the mass or the axle load, to the control. The lateral acceleration may be determined with the aid of a steering-angle sensor.

20 Claims, 3 Drawing Sheets

METHOD FOR DETERMINING THE LATERAL ACCELERATION OF A MOTOR VEHICLE

BACKGROUND INFORMATION

The present invention is based on a method for determining the lateral acceleration of a motor vehicle according to the species defined in the main claim. In the known methods, the lateral acceleration is essentially determined from signals of appropriate sensors, e.g. a yaw-rate sensor or acceleration sensor, with the aid of the steering angle and the vehicle velocity. At the same time, the location of the center of gravity of the motor vehicle is estimated from the measured data. In this context, determination of the lateral acceleration and of the location of the center of gravity is used in particular for the control of the vehicle dynamics and for preventing tipping (e.g. vehicle dynamics control VDC, electronic stability program ESP). However, the corresponding devices need additional sensors for determining the lateral acceleration, which create additional costs and can cause disturbances during hard use of a motor vehicle. In this connection, a device is also known from the German Patent 40 03 746 C2 which, for the level control, determines the spring travel of a wheel or an axle having a pneumatic suspension. The sensor supplies a weight-dependent signal which is used for controlling the air pressure in the pneumatic-suspension bellows of the pneumatic suspension. This method permits an axle-load-dependent braking-force metering (ALB).

SUMMARY OF THE INVENTION

In contrast, the method of the present invention for determining the lateral acceleration of a motor vehicle having the characterizing features of the main claim has the advantage that the lateral acceleration and the center-of-gravity height are calculated merely, from the signals of a wheel sensor and a load sensor. In principle, further sensors are not necessary.

It is especially advantageous that these sensors are already provided for other functions in many motor vehicles, for example, for controlling the chassis, braking functions, etc. Therefore, further sensors are not necessary, since the signals of the existing sensors can also be used for calculating the lateral acceleration. In this manner, costs are not only reduced, but the functioning of the control units also becomes more reliable, since possible error sources due to additional sensors are eliminated.

The measures specified in the dependent claims permit advantageous further refinements and improvements of the method indicated in the main claim. It is particularly advantageous that the lateral acceleration can be calculated according to a simple formula which is derivable from known parameters such as the axle load, the vehicle mass, the center-of-gravity height and the longitudinal acceleration of the motor vehicle.

Since, in contrast to cornering, no lateral acceleration occurs during straight-ahead driving, the center-of-gravity height can advantageously be determined for this driving condition. Its value is necessary for determining the lateral acceleration.

Furthermore, it is particularly favorable that the signal of the load sensor at one wheel, particularly at a rear wheel, is used for determining the lateral acceleration. Thus, on the basis of the changes in force occurring at the wheel, it is possible to differentiate in a simple manner whether the motor vehicle is traveling straight ahead or in a curve, since the lateral acceleration only has an effect during cornering.

In the steady-state instance, the lateral acceleration can be ascertained from the yaw velocity. This can be measured by a simple sensor, or can be calculated from the wheel speed.

It is further advantageous that the longitudinal acceleration is ascertained by simple time differentiation of the speed signal supplied by the wheel sensor. A resulting torque for the axle-load transfer can advantageously be calculated from the longitudinal acceleration.

The use of a pressure sensor for a pneumatic suspension or a spring-travel sensor for measuring the spring travel has the advantage that these sensors are already built into present-day vehicles, and thus their signals are multiply usable.

A convenient design approach is to determine the center-of-gravity height, particularly during straight-ahead driving, with the aid of a long-term filtering. Short-duration level fluctuations, which can be produced by acceleration changes or road impacts, are advantageously suppressed by the long-term filtering.

It is particularly advantageous that a software program, which is executed accordingly by the control, is used to implement the method.

Should further sensors be present for detecting the lateral acceleration, for example, should a rotation-rate sensor or yaw-rate sensor be present, then they can be advantageously checked and monitored for diagnostic purposes using the method of the present invention. A simple possibility thereby results for checking the existing sensors without additional hardware expenditure. This yields an even greater reliability for the functions implemented in the control unit.

BRIEF DESCRIPTION OF THE DRAWING

An exemplary embodiment of the present invention is shown in the Drawing, and explained in detail in the following description.

DESCRIPTION OF THE EXEMPLARY EMBODIMENT

Figure 1:
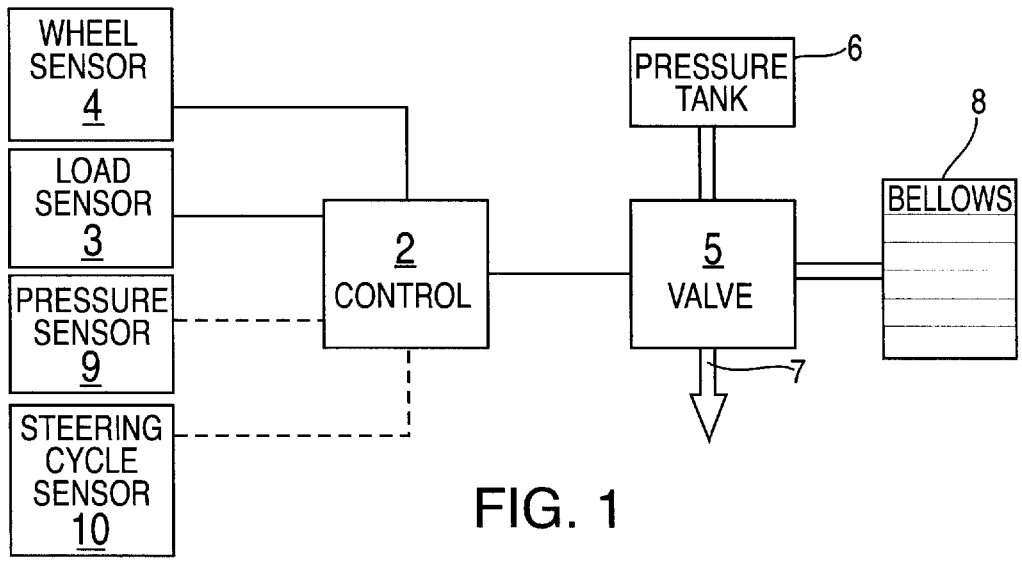
FIG. 1 shows a block diagram.

The block diagram in FIG. 1 shows a control 2, to which a load sensor 3, a wheel sensor 4 and, alternatively, further sensors such as a pressure sensor 9, a spring-travel sensor and/or a steering-angle sensor 10 are connected on the input side. Control 2 is connected on the output side to a valve 5 which is connected via suitable pressure lines to a pressure tank 6 on the input side. Furthermore, valve 5 is connected on the input side to pressure lines of an air-suspension bellows 8 of a pneumatic suspension. An outlet 7 is provided at valve 5 on the output side. Valve 5 is known per se, and is designed such that, depending on the activation by control 2, either lets the compressed air out of pressure tank 6 into air-suspension bellows 8, or, vice versa, reduces the air pressure in air-suspension bellows 8 via outlet 7. In this context, the air pressure in air-suspension bellows 8 can be measured, for example, by pressure sensor 9. The air pressure can advantageously be influenced as a function of the lateral acceleration or a level control.

Figure 2:
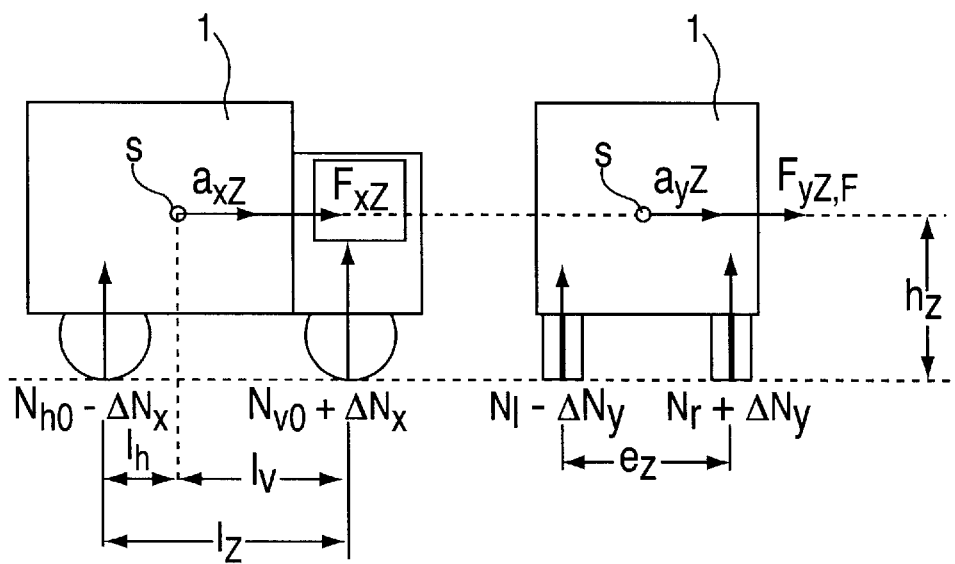
FIG. 2 shows a schematic representation of a commercial vehicle in side and rear view.

FIG. 2 shows the side and rear views of a motor vehicle 1, which is represented as an automotive truck. It shows theoretical center of gravity S, which lies at a center-of-gravity height $h_z$ above the roadway. Acting on the front and rear wheels, i.e. front and rear axle, according to the mass of the motor vehicle, is normal force N which, in response to acceleration in direction of travel ($a_{xZ}$), diminishes by force $\Delta_{Nx}$ at the rear axle and increases by the same force at the front axle. (Formula left part of FIG. 2). The axle load is distributed, in accordance with the center-of-gravity location, according to the relationships $l_h$ to $l_v$ over the rear axle and front axle, respectively, taking into account wheel base $l_z$. In this context, the subscripts signify: h=rear, v stands for front, x, y and z are the axial directions in the direction of travel, longitudinally and transversely to the direction of travel and to the vertical axis, respectively. Subscript 0 designates the average value.

The right part of FIG. 2 shows the forces acting in response to a corresponding lateral acceleration. The wheels of one axle have the average distance $e_z$. In response to a left-hand curve with an acceleration $a_{yz}$, the normal forces act on the left wheel $N_1-\Delta N_y$ and on the right wheel $N_r+\Delta N_y$. In this context, the height of center of gravity S is again assumed at $h_z$.

Figure 3:
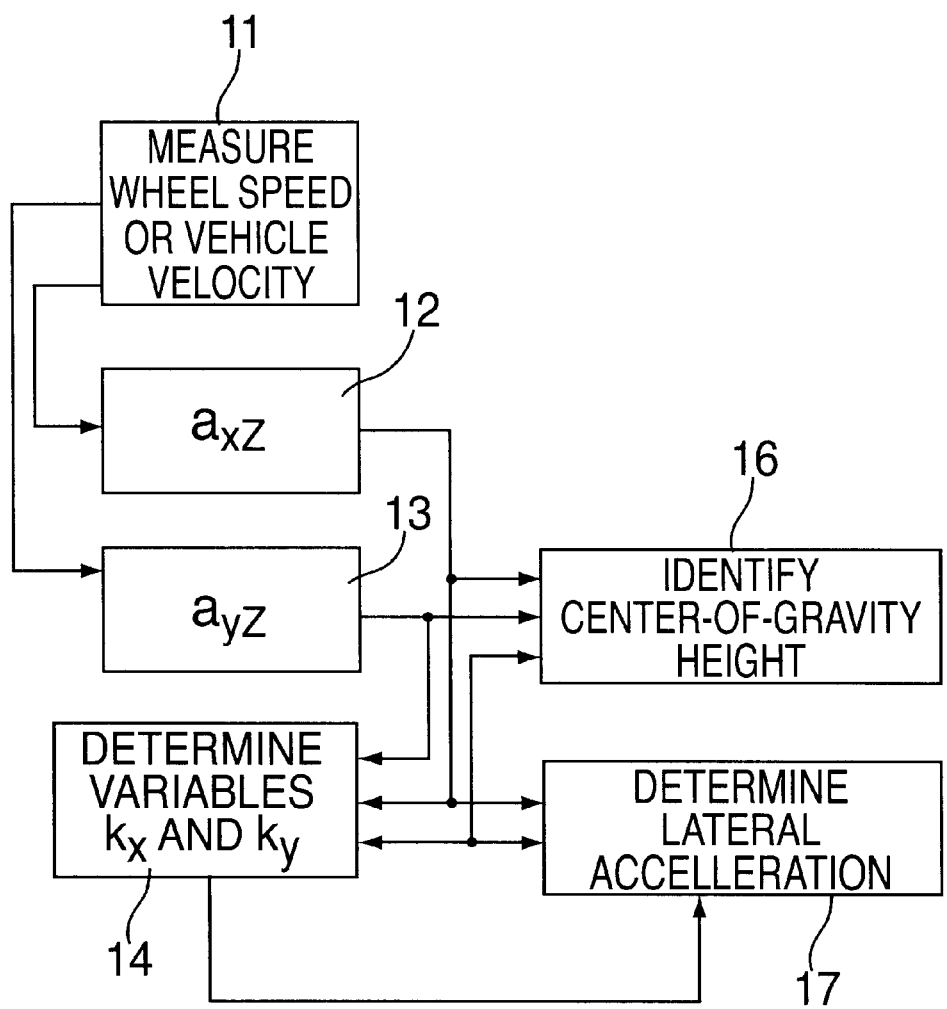
FIG. 3 shows a flow chart.

The flow chart in FIG. 3 shows the algorithm with which control 2 ascertains the lateral acceleration under the following described conditions and assumptions. In position 11, first of all the wheel speed or the vehicle velocity is measured. This is preferably carried out by wheel sensor 4. Wheel sensor 4 is already present on motor vehicle 1, and is needed, for example, for the speed measurement or for a vehicle system such as an antilock braking system, vehicle dynamics controller or the like. The control now calculates the acceleration in longitudinal direction $a_{xz}$ from the wheel speed. In addition, lateral acceleration $a_{yz}$ is calculated in position 13. The calculation is carried out for those driving situations which are not critical. Parallel thereto, the signal of load sensor 3 is calculated for identifying the center-of-gravity height during straight-ahead driving (position 16), and the lateral acceleration in all driving situations (position 17). Variables $k_z$ and $k_y$ are then determined in position 14 from the ascertained values. These variables are finally needed for calculating the lateral acceleration in all driving situations (position 17). This sequence in principle is explained more precisely in the following.

In theory, a connection exists between the axle load and the lateral acceleration. From this results a force distribution as was shown in FIG. 2. Since the axle-load distribution changes constantly as a function of the acceleration and deceleration both during straight-ahead driving and during cornering, the calculated values must be processed using an appropriate algorithm. For simplification, only the essential forces acting on the vehicle were taken into consideration.

Thus, according to FIG. 2, the normal force $$N_{h0} = \frac{l_v}{l_z} \cdot m_Z \cdot g$$

results for the rear axle and the normal force $$N_{v0} = \frac{l_h}{l_z} \cdot m_Z \cdot g \qquad (1)$$

results for the front axle.

Longitudinal acceleration $a_{xz}$ generates a centrifugal force $F_{xZ,F}$, whose resulting moment causes an axle-load distribution. Based on the axle-load distribution according to FIG. 2, the spin theorem is stated as:

$$\Delta N_x = \frac{h_Z \cdot m_Z \cdot a_{xZ}}{l_Z} \qquad (2)$$

The dynamic rear ($N_h$) and front ($N_v$) normal forces are calculated with equations (1) and (2) as follows:

$$N_h = \frac{l_v}{l_Z} \cdot m_Z \cdot g + \frac{h_Z \cdot m_Z \cdot a_{xZ}}{l_Z} \qquad (3)$$

$$N_v = \frac{l_v}{l_Z} \cdot m_Z \cdot g - \frac{h_Z \cdot m_Z \cdot a_{xZ}}{l_Z}$$

Analogous thereto, the influence of the centrifugal force acting in the transverse direction is calculated for the left and right wheel.

$$N_l = \frac{l}{2} \cdot m_Z \cdot g - \frac{h_Z \cdot m_Z \cdot a_{yZ}}{e_Z} \qquad (4)$$

$$N_r = \frac{l}{2} \cdot m_Z \cdot g - \frac{h_Z \cdot m_Z \cdot a_{yZ}}{e_Z}$$

Using factor $k_{z/1}$, which is a function of the chassis, the axle loads at the right and left side of the axle system can be determined, for example, for a tractor vehicle (v=front, h=rear, l=left, r=right). The normal force acting at the rear, left wheel is calculated from equations (3) and (4).

$$N_{hl} = N_{hl0} + \frac{l}{2} \cdot \Delta N_x - k_{Z/l} \cdot \Delta N_y \qquad (5)$$

which can be explicitly written as follows:

$$N_{hl} = \frac{l_v \cdot m_Z \cdot g}{2 \cdot l_Z} + \frac{h_Z \cdot m_Z \cdot a_{xZ}}{2 \cdot l_Z} - \frac{k_{Z/l} \cdot h_Z \cdot m_Z \cdot a_{yZ}}{e_Z} \qquad (6)$$

The measured signal of the bellows pressure sensor is a picture of normal force $N_{h1}$ acting at the wheel.

After the offset adjustment, which eliminates the static portion of the measuring signal, the sensor measures normal-force difference $\Delta N_{h1}$.

$$\Delta N_{hl} = \left(\frac{h_z \cdot m_z}{2 \cdot l_Z}\right) \cdot a_{xZ} - \left(\frac{k_{Z/l} \cdot h_Z \cdot m_Z}{e_Z}\right) \cdot a_{yZ} \qquad (7)$$

Substituting parameters $k_x$, $k_y$, bellows pressure-sensor signal alb$_{hl}$ is expressed as:

$$alb_{hl} = k_y \cdot a_{yZ} + k_x \cdot a_{xZ} \qquad (8)$$

The calculation of the lateral acceleration now follows from the preceding superimpositions. In equation (8), longitudinal acceleration $a_{xZ}$, calculated from the vehicle velocity, and bellows pressure signal alb$_{hl}$ are known. Parameters $k_x$ and $k_y$ are still unknown. They can be determined as follows:

1.) In the stable, steady-state instance, the lateral acceleration can be calculated from the yaw velocity in terms of the equation $$a_y = v_z \cdot d\psi_z/dt \tag{9}$$

Under the aforesaid steady-state and linearity conditions, parameters $k_x$, $k_y$ can be identified in specific maneuvers.

In this context, the yaw velocity can either be measured or calculated from the wheel speed (possibly also using a reference model with the aid of a steering-angle sensor).

2.) Since parameters $k_x$, $k_y$ are calculated from geometrical parameters and variables which are a function of the chassis, constants $k_x$ and $k_y$ could be determined in light of these known vehicle variables. This solution needs no information about the yaw velocity.

The parameter values obtained can now be inserted into equation (8), and the equation solved for the lateral acceleration:

$$a_{yZ} = \frac{alb_{hl} - k_x \cdot a_{xZ}}{k_y} \tag{10}$$

In summary, it follows that lateral acceleration $a_{yz}$ is determinable according to equation 10 from axle load $alb_{hl}$, longitudinal acceleration $a_{xz}$ and parameters $k_x$ and $k_y$. Parameters $k_x$ and $k_y$ vary with the vehicle mass and the center-of-gravity height. If center-of-gravity height $h_z$ is unknown, in the most unfavorable case, $h_z = 2/3$ of the cargo-bay height can be assumed as the center-of-gravity height, if in first approximation, steady-state values with a non-displaceable load are assumed.

The wheel speeds or the yaw velocity can also be utilized for calculating parameters $k_x$ and $k_y$ by approximation.

For a continuous ascertainment of the center-of-gravity height, in an alternative development of the present invention, steering-angle sensor 10 is additionally used. Center-of-gravity height $h_z$ can be calculated assuming lateral acceleration $a_{yz}$ is zero, which is fulfilled in the case of straight-ahead driving. Thus, yielded for the center-of-gravity height is:

$$h_z = (2 \cdot l_z \cdot alb_{hl})/(l_z \cdot a_{xz})$$

This value is filtered long-term, as long as the vehicle is driving straight ahead. In response to a cornering, this value is frozen and is used for calculating lateral acceleration $a_{yz}$ according to equation (9).

A further alternative for determining center-of-gravity height $h_z$ can be carried out by estimation, both local road conditions and the vehicle velocity being taken into account. Thus, the calculation of the lateral acceleration can then be carried out for a center-of-gravity height $h_z$, it being assumed that strong steering maneuvers with good adhesion on the road at high speeds threaten the overturn of the vehicle. On the other hand, at lower speed, it is assumed that steering maneuvers do not lead to any high lateral acceleration. For this case, the center-of-gravity height can be estimated accordingly.

In practice, it has turned out that the middle range between low and high speeds is critical. As of a pre-set speed, the lateral acceleration is always only calculated. Below this threshold, the instantaneously ascertained center-of-gravity height is constantly compared to the long-term-filtered value. If the deviation exceeds the predefined threshold, then instead of the estimation, the lateral acceleration is calculated according to the aforesaid method.

When using this method in a device for preventing tipping, it has the advantage that it is possible to dispense with additional sensors.

Figure 4:
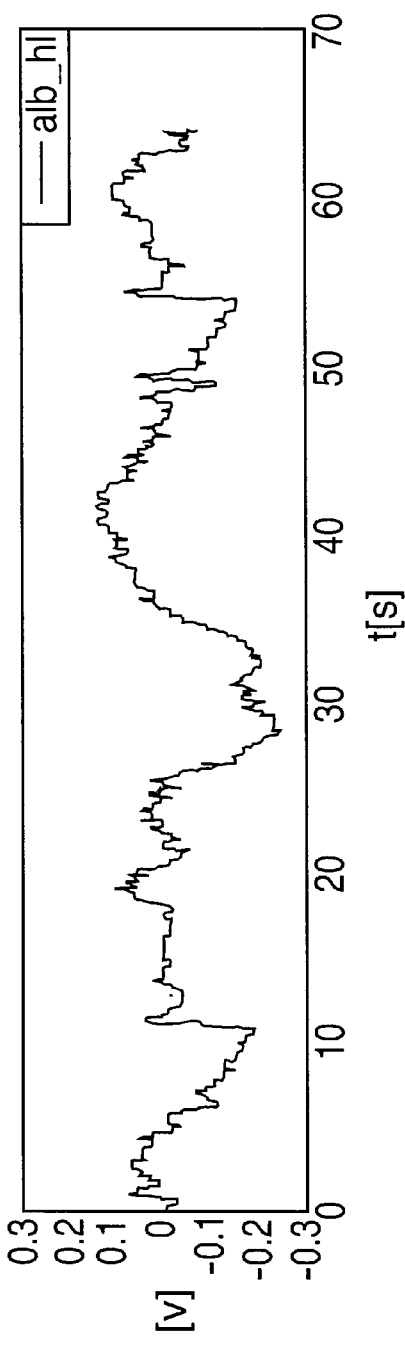
FIG. 4 shows a diagram having a measuring curve for the dynamic axle load.
Figure 5:
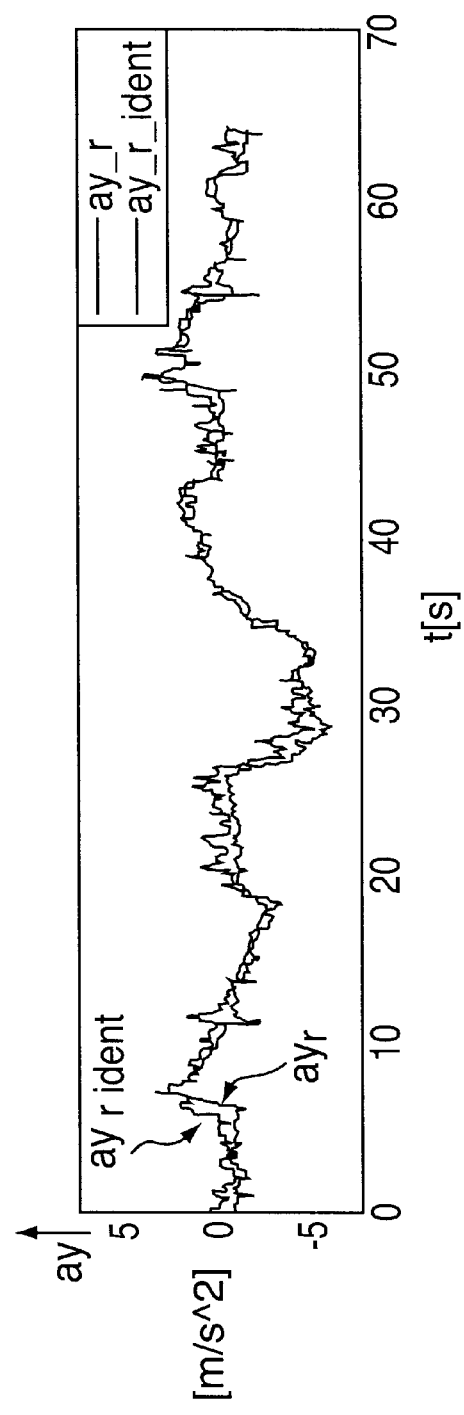
FIG. 5 shows a comparison diagram with calculated lateral-acceleration values.

FIGS. 4 and 5 show diagrams in which the relationships are depicted. FIG. 4 shows a diagram having the time characteristic of load sensor 3. In one special specific embodiment, this is the signal of pressure sensor 9 which represents the pressure conditions in the air-suspension bellows of a pneumatic suspension. In an alternative embodiment of the invention, load sensor 3 can be a spring-travel sensor which determines the wheel or axle load from the spring travel at the wheel or an axle. The diagram characteristic according to FIG. 4 shows axle load $alb_{hl}$, which can also be measured at the rear, left wheel of an axle.

FIG. 5 shows two diagram curves for the lateral acceleration, lateral acceleration $a_{y\_r}$ having been measured, and lateral acceleration curve $a_{y\_r\_ident}$ having been calculated according to equation (10). From the curve shape, one can see that, over the course of time, the calculated acceleration curve, which was based on the data of load sensor 3 and wheel sensor 4, readily agrees with measured curve $a_{y\_r\_ident}$.

The lateral acceleration is preferably calculated in a program which may be integrated in control unit 2 already present. Existing control unit 2 then takes over the functions.

What is claimed is:

1. A method for determining a lateral acceleration of a motor vehicle, comprising the steps of:

detecting a load at one of a wheel and an axle of the motor vehicle by a load sensor;

supplying a signal corresponding to the load sensor to a control device;

supplying a signal corresponding to at least one sensor to the control device, the at least one sensor including at least one of a wheel sensor and a speed sensor; and calculating a lateral acceleration and center-of-gravity height of the motor vehicle from at least the signals corresponding to the load sensor and the wheel sensor by the control device as a function of a driving condition of the motor vehicle in accordance with a predefined algorithm.

2. The method according to claim 1 wherein the control device calculates the lateral acceleration in the calculating step during cornering of the motor vehicle.

3. The method according to claim 1, wherein the control device calculates the center-of-gravity height in the calculating step during straight-ahead driving.

4. The method according to claim 1, further comprising the step of determining the axle load by the control device from the signal of the load sensor at a rear wheel of an automotive truck.

5. The method according to claim 1, wherein the control device calculates the lateral acceleration in the calculating step in accordance with a yaw velocity.

6. The method according to claim 1, wherein the load sensor includes a pressure sensor configured to measure air pressure in a pneumatic suspension bellows of a pneumatic suspension.

7. The method according to claim 1, wherein the load sensor includes a spring-travel sensor configured to determine the load from a spring travel of the one of the wheel and the axle of the motor vehicle.

8. The method according to claim 1, further comprising the steps of:

detecting a steering angle of the motor vehicle by a steering-angle sensor; and supplying a signal corresponding to the steering-angle sensor to the control device.

9. The method according to claim 1, wherein at least one of the load sensor and the wheel sensor are components of one of a tipping preventing device and a level control device.

10. The method according to claim 1, wherein the algorithm is in the form of a software program.

11. A method for determining a lateral acceleration of a motor vehicle, comprising the steps of:
   detecting a load at one of a wheel and an axle of the motor vehicle by a load sensor;
   supplying a signal corresponding to the load sensor to a control device;
   supplying a signal corresponding to at least one sensor to the control device, the at least one sensor including at least one of a wheel sensor and a speed sensor; and
   calculating at least one of lateral acceleration and center-of-gravity height of the motor vehicle from at least the signals corresponding to the load sensor and the wheel sensor by the control device as a function of a driving condition of the motor vehicle in accordance with a predefined algorithm, wherein the lateral acceleration is calculated in the calculating step according to the formula:

$$a_{yZ} = \frac{alb_{hl} - k_x \cdot a_{xZ}}{k_y},$$

wherein $a_{yz}$ is the lateral acceleration, $alb_{hl}$ is an axle load calculated for one wheel, $k_x$ and $k_y$ are parameters that are a function of a vehicle mass and the center-of-gravity height of the motor vehicle and $a_{xz}$ is a longitudinal acceleration of the motor vehicle.

12. The method according to claim 11, further comprising the step of determining the longitudinal acceleration by the control device from signals of the wheel sensor.

13. A method for determining a lateral acceleration of a motor vehicle, comprising the steps of:
   detecting a load at one of a wheel and an axle of the motor vehicle by a load sensor;
   supplying a signal corresponding to the load sensor to a control device;
   supplying a signal corresponding to at least one sensor to the control device, the at least one sensor including at least one of a wheel sensor and a speed sensor; and
   calculating a center-of-gravity height of the motor vehicle from at least the signals corresponding to the load sensor and the wheel sensor by the control device as a function of a driving condition of the motor vehicle in accordance with a predefined algorithm.

14. The method according to claim 13, wherein the control device calculates the center-of-gravity height in the calculating step during straight-ahead driving.

15. The method according to claim 13, further comprising the step of determining the axle load by the control device from the signal of the load sensor at a rear wheel of an automotive truck.

16. The method according to claim 13, wherein the load sensor includes a pressure sensor configured to measure air pressure in a pneumatic suspension bellows of a pneumatic suspension.

17. The method according to claim 13, wherein the load sensor includes a spring-travel sensor configured to determine the load from a spring travel of the one of the wheel and the axle of the motor vehicle.

18. The method according to claim 13, further comprising the steps of:
   detecting a steering angle of the motor vehicle by a steering-angle sensor; and
   supplying a signal corresponding to the steering-angle sensor to the control device.

19. The method according to claim 13, wherein at least one of the load sensor and the wheel sensor are components of one of a tipping preventing device and a level control device.

20. The method according to claim 13, wherein the algorithm is in the form of a software program.

* * * * *

UNITED STATES PATENT AND TRADEMARK OFFICE
CERTIFICATE OF CORRECTION

PATENT NO. : 6,584,396 B2
DATED : June 24, 2003
INVENTOR(S) : Gabriel Wetzel et al.

It is certified that error appears in the above-identified patent and that said Letters Patent is hereby corrected as shown below:

Column 1,
Line 7, change "is based on" to -- relates to --
Line 8, delete "according to the species defined in the main claim. In the known"
Line 9, change "methods." to -- In conventional methods, --
Line 23, change "also know from the German Patent" to -- described in German Published Patent Application No. --
Line 24, change "C2" to -- , --
Line 32, change "SUMMARY OF THE INVENTION" to -- SUMMARY --
Line 41, change "It is especially advantageous that these sensors are already" to -- These sensors may already be --
Lines 45, 53 and 60, change "can" to -- may --
Line 64, change "particularly" to -- e.g., --
Line 64, change "is" to -- may be --

Column 2,
Lines 3, 4, 5, 9, 20, 28 and 66, change "can" to -- may --
Line 7, change "It is further advantageous that the" to -- The --
Line 21, change "are" to -- may be --
Line 23, change "It is particularly advantageous that a" to -- A --
Line 24, change "is" to -- may be --
Delete lines 35-48 and replace with -- BRIEF DESCRIPTION OF THE DRAWINGS Figure 1 is a schematic block diagram of a control unit.

Figure 2 is a schematic side and rear view of a commercial vehicle.

Figure 3 is a flow chart illustrating the method according to the present invention.

Figure 4 is a graph illustrating, comparatively, calculated lateral acceleration values.

DETAILED DESCRIPTION --

Line 50, change "DESCRIPTION OF THE EXEMPLARY EMBODIMENT" to -- DETAILED DESCRIPTION --
Line 52, change "in" to -- illustrated in --
Line 61, change "is know per se," to -- conventional --
Line 62, change "designed such" to -- configured so --

UNITED STATES PATENT AND TRADEMARK OFFICE
CERTIFICATE OF CORRECTION

PATENT NO. : 6,584,396 B2
DATED : June 24, 2003
INVENTOR(S) : Gabriel Wetzel et al.

It is certified that error appears in the above-identified patent and that said Letters Patent is hereby corrected as shown below:

Column 3,
Line 1, change "can" to -- may --
Line 4, change "shows the side and rear views" to -- is a side view and rear view --
Line 5, change "represented" to -- illustrated --
Line 5, change "shows" to -- illustrates a --
Line 6, change "lies" to -- is --
Line 8, change "i.e." to -- i.e., --
Line 23, change "shows" to -- illustrates --
Line 31, change "chart in" to -- chart illustrated in --
Line 35, change "This is preferably carried out" to -- This may be performed --
Line 39, change "or the like" to -- , etc. --
Line 42, change "carried out" to -- performed --
Line 55, change "was shown" to -- illustrated --

Column 4,
Line 9, change "whose resulting motion" to -- the resulting motion of which --
Lines 43 and 66, change "can" to -- may --

Column 5,
Lines 2, 7, 30, 33, 38 and 58, change "can" to -- may --
Line 14, change "could" to -- may --
Line 36, change "development" to -- example embodiment --
Line 50, change "can be carried out " to -- may be performed --
Line 52, change "can then be carried out" to -- may then be performed --

Column 6,
Line 4, change "show diagrams in which" to -- are graphs illustrating --
Lines 5 and 15, change "shows" to -- illustrates --
Line 6, change "special specific" to -- example --
Line 9, change "alternative" to -- alternative example --
Lines 10 and 14, change "can" to -- may --
Line 13, change "according to" to -- illustrated in --
Line 18, change "one can see" to -- it is illustrated --

UNITED STATES PATENT AND TRADEMARK OFFICE
CERTIFICATE OF CORRECTION

PATENT NO. : 6,584,396 B2
DATED : June 24, 2003
INVENTOR(S) : Gabriel Wetzel et al.

It is certified that error appears in the above-identified patent and that said Letters Patent is hereby corrected as shown below:

<u>Column 6 (cont'd),</u>
Line 23, change "is" to -- may be --

Signed and Sealed this

Thirty-first Day of August, 2004

JON W. DUDAS
*Director of the United States Patent and Trademark Office*